United States Patent [19]
Hartley

[11] Patent Number: 4,493,435
[45] Date of Patent: Jan. 15, 1985

[54] LIQUID DISPENSING SYSTEM AND AUTOMATIC SELECTOR THEREFOR

[75] Inventor: E. Dale Hartley, Malibu, Calif.

[73] Assignee: Product Research And Development, Anaheim, Calif.

[21] Appl. No.: 440,532

[22] Filed: Nov. 10, 1982

[51] Int. Cl.³ .................. B67D 5/08; B67D 35/22
[52] U.S. Cl. ........................ 222/52; 222/94; 222/136; 222/145; 137/113
[58] Field of Search ............ 222/20, 6, 52, 64, 94, 222/129, 136, 144.5, 145, 386.5, 92, 66; 137/113, 625.15, DIG. 8, 487.5

[56] References Cited
U.S. PATENT DOCUMENTS

| | | | |
|---|---|---|---|
| 1,958,155 | 5/1934 | Watkins | 137/113 X |
| 2,408,799 | 10/1946 | Melichar | 137/113 |
| 2,630,821 | 3/1953 | Arey et al. | 137/113 |
| 2,687,140 | 8/1954 | Clair | 137/113 |
| 3,008,481 | 11/1961 | Matheson | 137/112 |
| 3,263,615 | 8/1966 | Hofer | 137/487.5 X |
| 3,533,431 | 10/1970 | Kuenzel | 137/113 |
| 4,275,823 | 6/1981 | Credle, Jr. | 222/94 |

Primary Examiner—H. Grant Skaggs
Assistant Examiner—Michael S. Huppert
Attorney, Agent, or Firm—Gordon L. Peterson

[57] ABSTRACT

A dispensing system comprising first and second collapsible storage containers, a pump and a pressure responsive selector coupled to both of the storage containers and to the intake side of the pump. The selector includes a valve movable between a first position in which the selector provides communication between the first storage container and the pump and blocks communication between the second storage container and the pump and a second position in which the selector provides communication between the second collapsible container and the pump and blocks communication between the first collapsible container and the pump. An actuator is responsive to the pressure drop at the selector resulting from the collapse of one of the collapsible containers for moving the valve from one of its positions to the other of its positions.

20 Claims, 3 Drawing Figures

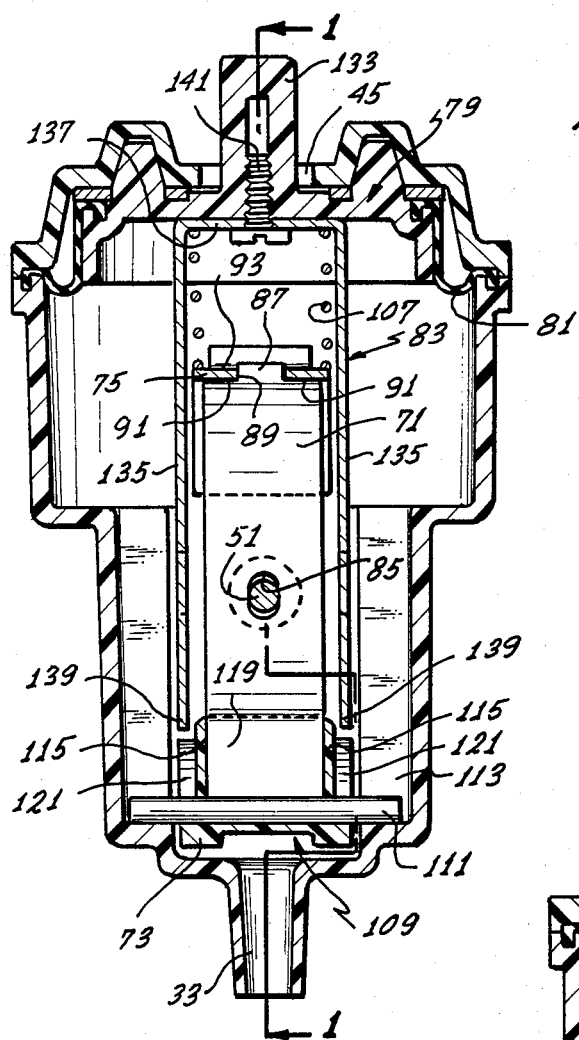
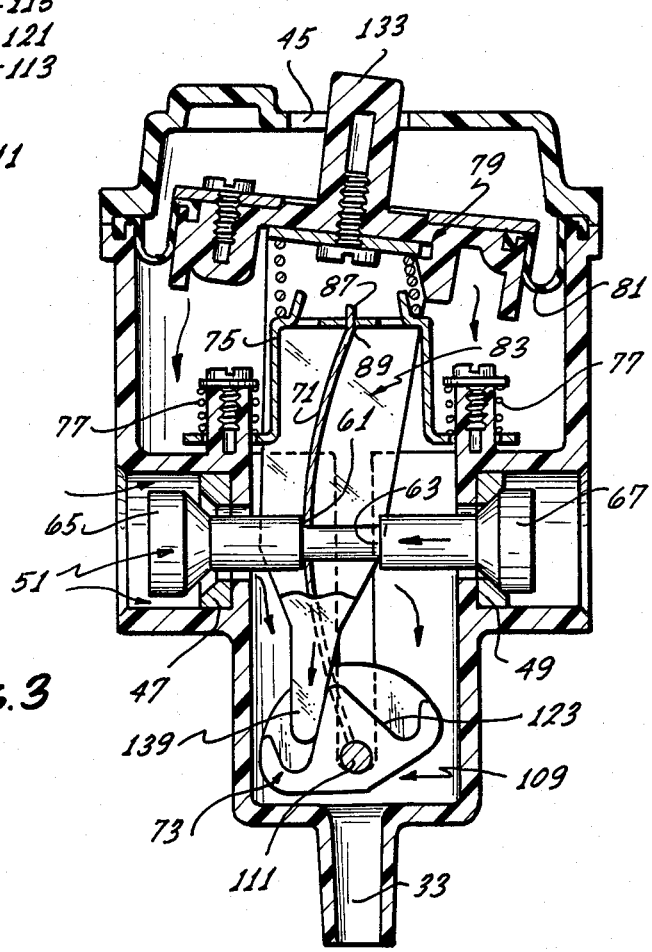
FIG. 2
FIG. 3

LIQUID DISPENSING SYSTEM AND AUTOMATIC SELECTOR THEREFOR

BACKGROUND OF THE INVENTION

A typical beverage dispensing system includes a storage container for storing a liquid to be dispensed and a pump for pumping the liquid from the storage container to one or more dispensinFg in tes. With this arrangement, the entire dispensing system must be shut down in order to replace an empty storage container with a full one.

In an effort to avoid this downtime of the dispensing system, two storage containers can be provided, together with a switching system for switching from the empty container to the full container. One such apparatus is shown in Harvill U.S. Pat. No. 4,014,461. In the patented apparatus, the switching system comprises first and second check valves in the circuit with the first and second storage containers, respectively, and a manually operated bypass valve for bypassing either of the check valves. With this system, the switching from an empty container to a full container is obtained automatically with the check valves, but it is necessary to manually operate the bypass valve in order to permit replacement of the empty container with a full one.

SUMMARY OF THE INVENTION

This invention provides a selector for a liquid dispensing system which is completely automatic and which does not require any manual operation. When the selector of this invention has selected one of the containers, the non-selected or empty container can be replaced with a full one.

The automatic selector is particularly adapted for use with a dispensing system which comprises first and second storage means for storing a liquid to be dispensed and a pump for pumping liquid from the containers to one or more dispensing heads. The automatic selector has first and second inlets which are coupled, respectively, to the first and second storage means and an outlet which is coupled to the intake side of the pump.

The selector provides communication between one of the storage means and the pump while blocking communication between the other of the storage means and the pump. When the selected storage means is empty, pump suction pressure provides a pressure drop at the selector. A pressure responsive actuator responds to this pressure drop and actuates the selector so that communication is now provided between the pump and the previously non-selected storage means. In addition, the selector automatically blocks communication between the empty storage means and the pump so that the empty storage means can be replaced.

In order to obtain a sharp pressure drop when the storage means is empty, each of the storage means is preferably collapsible and may include, for example, a collapsible plastic bag within a box. Of course, each of the storage means may comprise one or more of such collapsible bags within a box. In a broader sense, each of the storage means should be essentially closed when such storage means has at least some (which is preferably essentially all) of the liquid removed therefrom, and collapsible storage containers are the preferred species.

The selector preferably includes valve means movable between first and second positions to provide the storage means selection function. In a preferred construction, the valve means includes first and second valve seats communicating, respectively, with the first and second storage means and a valve element movable between first and second positions to select either of the storage means.

The actuator means can advantageously include bistable spring means having first and second states for at least assisting in retaining the valve element in the first and second positions, respectively. The bistable spring means has a center or neutral position and the actuator can move the bistable spring means from either of its states through the neutral position so that the spring means can thereafter snap to the state toward which it was being moved. In so doing, the bistable spring means provides at least some of the driving force for moving the valve element between its two positions. Preferably the bistable spring means is drivingly coupled to the valve element with lost motion so that the bistable spring means does not begin driving the valve means until the spring means has moved through neutral and has reached a position where it can exert substantial force on the valve means. The valve means is arranged so that, during the lost motion movement of the bistable spring means, the suction pressure tends to hold the valve means in the position in which the valve means was previously placed.

The pressure responsive means can advantageously include a pressure responsive plunger. The plunger can be moved in response to the pressure drop or manually to switch from one storage means to the other.

Although the bistable spring means can be of various different constructions, it preferably includes a leaf spring. The leaf spring can be snapped through center or neutral by affixing one end of the leaf spring to a pivotable rocker which is pivoted by an actuator member that is driven by the pressure responsive plunger. Once the rocker carries the leaf spring through neutral, the resilience of the leaf spring snaps the spring to its other state.

To more accurately control the force which the bistable spring means applies to the valve element, the bistable spring means preferably includes a force applying member engaging the leaf spring and resilient means for urging the force applying member in a direction to move the leaf spring farther from the neutral position. This provides a resilient anchor point for one end of the leaf spring, and this is preferred because, with both ends rigidly anchored, the leaf spring may form a compound curve rather than moving through neutral and snapping to its other state. Also, with this construction, even an accumulation of tolerances in the same direction does not adversely influence the force which the bistable spring means applies to the valve element.

The invention, together with additional features and advantages thereof, may best be understood by reference to the following description taken in connection with the accompanying illustrative drawing.

BRIEF DESCRIPTION OF THE DRAWING

FIG. 2 is a sectional view taken generally along line 2—2 of FIG. 1.

FIG. 3 is a sectional view of the selector similar to FIG. 1 illustrating the operation of the selector.

DESCRIPTION OF THE PREFERRED EMBODIMENT

Figure 1:
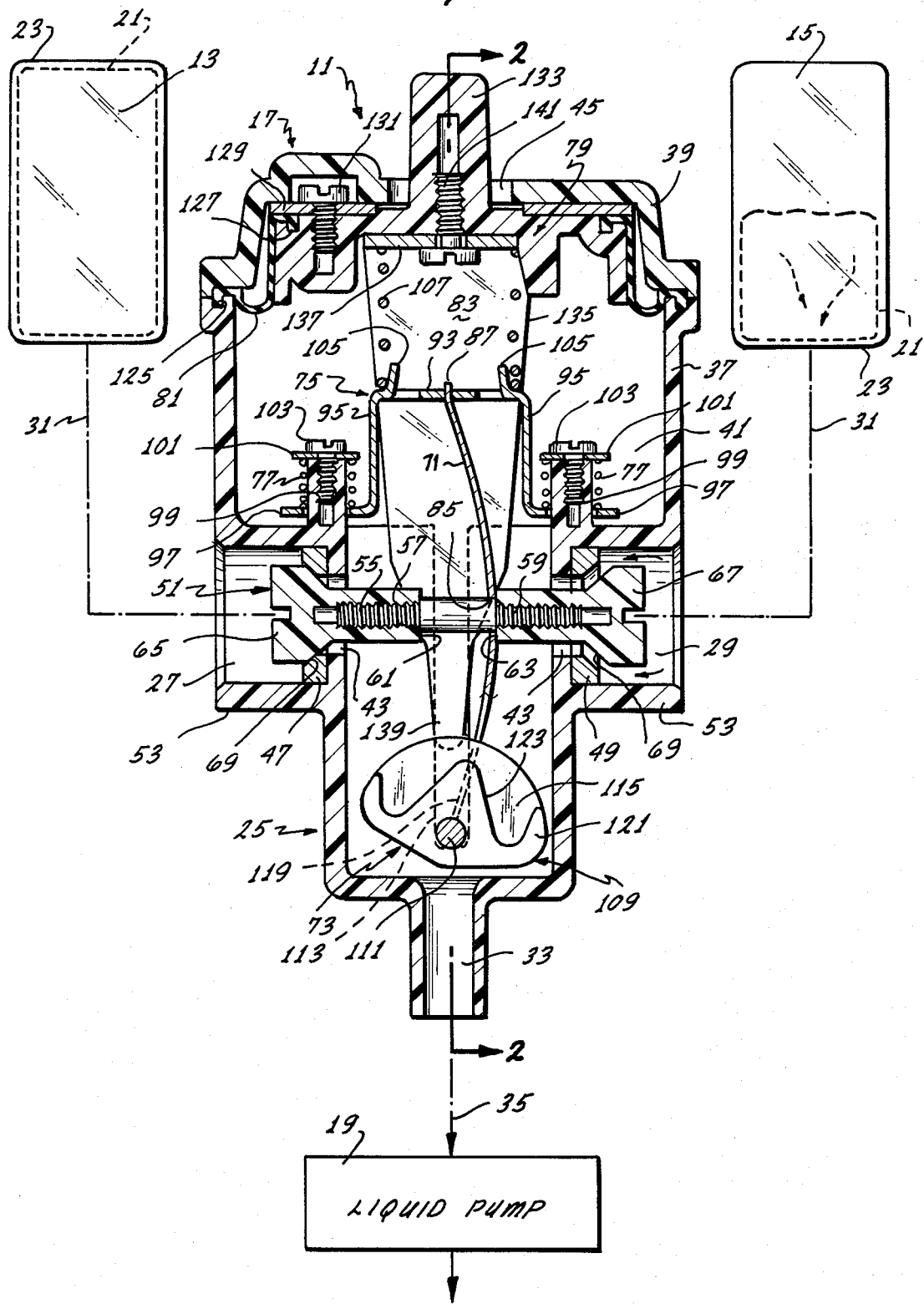
FIG. 1 is a partially schematic illustration of a liquid dispensing system constructed in accordance with the teachings of this invention with the automatic selector being illustrated in longitudinal section.

FIG. 1 shows a beverage dispensing system 11 which generally comprises two storage means in the form of collapsible storage containers 13 and 15, a selector 17 and a pump 19. In the embodiment illustrated, each of the storage containers 13 comprises a collapsible flexible plastic bag 21 within a suitable rigid structure, such as a box 23, and such storage containers are conventional. Of course, each of the storage containers 13 and 15 can be replaced with multiple storage containers, if desired. Each of the storage containers 13 and 15 contains a liquid to be dispensed which may be a beverage, such as soft drink syrup, wine, juice concentrate or the like.

The selector 17 includes a housing 25 which provides aligned inlets 27 and 29 coupled by conduits 31 to the containers 13 and 15, respectively, and an outlet 33 suitably coupled by a conduit 35 to the inlet side of the pump 19. In the position shown in FIG. 1, the selector 17 allows the pump 19 to draw liquid from the container 15 and provide it to a dispensing head (not shown) or other suitable apparatus on the discharge side of the pump 19. In the position shown in FIG. 1, the selector 17 blocks communication between the container 13 and the pump 19.

Although the housing 25 can be of various different constructions, in the embodiment illustrated, it includes a body 37 and a cover 39, both of which are integrally molded from a suitable plastic material. The housing has an interior chamber 41, aligned apertures 43 partially defining the inlets 27 and 29 and a central opening 45 in the cover 39.

Valve means comprising valve seats 47 and 49 of rubber or other suitable material and a movable valve element 51 are provided on the housing 25. Although various constructions can be employed, in the embodiment illustrated, the valve seats 47 and 49 are annular and they are bonded in bosses 53 of the housing 25 immediately outwardly of, and aligned with, the apertures 43.

The valve element 51 comprises a core 55 of metal or plastic and end sections 57 and 59 attached to the core 55 in any suitable way, such as by screw threads. The end sections 57 and 59 have shoulders 61 and 63, respectively, which are spaced apart by a central section of the core 55. The end sections 57 and 59 also have enlarged heads 65 and 67, respectively, for engagement with the valve seats 47 and 49, respectively. Preferably, each of the heads 65 and 67 has a part spherical annular surface 69 for engaging the associated valve seat. The spacing between the surfaces 69 is greater than the spacing between the sealing surfaces of the valve seats 47 and 49, and accordingly, when the head 65 is seated against the valve seat 47, the head 67 is spaced from the valve seat 49 as shown in FIG. 1. Conversely, with the head 67 seated against the valve seat 49, the head 65 is spaced from the valve seat 47 as shown in FIG. 3.

Actuator means is provided for moving the valve element 51 between the positions of FIGS. 1 and 3 and for assisting in holding the valve element in whichever of these positions it is placed. Generally, the actuator means includes a leaf spring 71, a rocker 73, a force-applying member in the form of a bracket 75, coil compression springs 77, a pressure responsive plunger 79, a diaphragm 81 and an actuator member 83. The leaf spring 71 is a broad, flat member constructed of a suitable spring steel, and in its relaxed position, it is planar. The leaf spring 71 has an opening 85 through which the central region of the core 55 of the valve element 51 can freely pass as shown in FIGS. 1 and 2. This enables the leaf spring 71 to travel freely, i.e., with lost motion, between the shoulders 61 and 63 without driving the valve element 51.

The leaf spring 71 has a tab 87 at its upper end which is received within a slot 89 of the bracket 75 as shown in FIGS. 1 and 2. In addition, the leaf spring 71 has upper edges 91 which bear against the underside of a transverse wall 93 of the bracket 75 to thereby mount the upper end of the leaf spring.

The bracket 75 has side walls 95 and apertured flanges 97 which fit over internally threaded bosses 99 integral with the body 37. The springs 77 act between the flanges 97 and washers 101 mounted on top of the bosses 99, respectively, by screws 103 to resiliently bias the bracket 75 downwardly. Thus the bracket 75 forms a floating, resilient anchor for the leaf spring 71.

The bracket 75 also has ears 105 forming a guide for a relatively light coil compression spring 107 which acts between the bracket and the plunger 79. Thus, the bracket 75 is biased downwardly by the springs 77 and 107 and upwardly by the leaf spring 71.

The lower end of the leaf spring 71 is mounted on the rocker 73. In this regard, the rocker 73 comprises a rocker body 109 and a shaft 111 mounted on the rocker body. The shaft 111 is retained within opposed channels 113 with semi-cylindrical lower ends formed in the body 37 and is resiliently urged against the lower ends of these channels by the leaf spring 71 and the spring 77.

The rocker body 109 which may be molded from plastic material comprises identical discs 115 separated by spaced parallel webs which are themselves spaced apart to define a slot 119 for receiving the lower end portion of the leaf spring 71. The slot 119 extends to the shaft 111 so that this shaft, which is constructed of metal and, therefore, has a periphery which is more resistant than the rocker body 109 to being cut by the end of the leaf spring 71, can engage and support the leaf spring 71. The outer faces of each of the discs 115 are provided with raised faces 121 defining identical, generally W-shaped cam tracks 123. The rocker body 109 can pivot from the position shown in FIG. 1 counterclockwise toward the position shown in FIG. 3 to move the leaf spring 71 from the position shown in FIG. 1 through the neutral position, i.e., the vertical position as viewed in FIG. 1, to allow the resilience of the leaf spring to move the valve element 51 to the position shown in FIG. 3.

The rocker body 109 can be pivoted by downward movement of the plunger 79 and the actuator member 83. In this regard, the rolling diaphragm 81 is annular and has an annular sealing bead 125 sandwiched between the body 37 and the cover 39, and a sealing bead 127 which is held in sealing engagement with the main portion of the plunger 79 by a retaining ring 129 attached to the main portion of the plunger by fasteners in the form of screws 131 (only one being shown in FIG. 1). The plunger 79 includes a centrally located, raised button 133 which projects through the opening 45 to permit the plunger to be manually depressed to thereby manually operate the selector 17. The rolling diaphragm 81, not only seals the plunger 79 to the housing 25, but also mounts the plunger 79 for translation upwardly and downwardly within the housing and for limited pivotal movement as described more fully hereinbelow.

Although various constructions are possible, in the embodiment illustrated, the actuator member 83 is in the form of a channel having spaced parallel legs 135 integrally joined by a web 137. Each of the legs 135 has distal end portions of reduced width defining cams 139.

The actuator member 83 is centrally mounted on the plunger 79 by a screw 141 which extends through the web 137 and into a threaded socket formed in the button 133. When so mounted, the legs 135 project downwardly on opposite sides of the leaf spring 71 and the bracket 75. In the upward position of the plunger as shown in FIGS. 1 and 2, the cams 139 are slightly above, and in direct alignment with, the cam tracks 123, respectively.

In the position shown in FIG. 1, the resilience of the leaf spring 71 and of the spring 77 cause the leaf spring to bear against the shoulder 63 of the valve element 51 to hold the valve element in the righthand position as viewed in FIG. 1 in which the head 65 closes the inlet 27 and the head 67 is spaced from its valve seat 49 to leave the inlet 29 open. Accordingly, operation of the pump 19 creates suction pressure in the conduit 35, the chamber 41 of the housing 25 and in the conduit 31 to withdraw liquid from the container 15 and pump it to the desired destination. The suction pressure existing within the chamber 41 is insufficient to pull the plunger 79 downwardly at all, or sufficiently to operate the selector 17, so long as there is liquid in the container 15 to be pumped. As liquid is withdrawn from the container 15, the collapsible bag 21 collapses, and when all of the liquid is withdrawn, the bag 21 is essentially fully collapsed. As the pump operates with the bag 21 of the container 15 collapsed, there is a sharp increase in vacuum, i.e., reduction in pressure, on the suction side of the pump and within the chamber 41. This drastic pressure reduction creates a differential pressure across the plunger 79 inasmuch as ambient air pressure acts on the upper or outer face of the plunger. Accordingly, the plunger 79 moves downwardly as viewed in FIG. 1 toward the position shown in FIG. 3 as a function of the pressure reduction.

As the plunger 79 moves downwardly, the cams 139 are moved downwardly into engagement with the associated cam tracks 123. Because the pressure reduction is not instantaneous, the plunger 79 moves downwardly over a short interval. Because the leaf spring 71 holds the rocker 73 in its maximum clockwise position as shown in FIG. 1, the cams 139 engage the lefthand portion of the cam tracks. As downward movement of the plunger 79 and the cams 139 continues, the cams 139 slide along the cam tracks 123 to pivot the rocker body 109 and the shaft 111 counterclockwise toward the position of FIG. 3. Because of the shape of the cam tracks, the plunger 79 and the actuator member 83 pivot or tilt clockwise as permitted by the diaphragm 81 as shown in FIG. 3.

As the rocker body 109 begins to pivot counterclockwise, it carries with it the lower end portion of the leaf spring 71. This moves the leaf spring 71 against the biasing force of the springs 77 from the position shown in FIG. 1 to and through the neutral position, i.e., the vertical position as shown in FIG. 1. The movement of the leaf spring 71 toward the neutral position forces the bracket 75 upwardly against the biasing force of the springs 77 and 107 to allow the leaf spring to be essentially flat at the neutral position. The low pressure within the chamber 41 and the normal liquid pressure within the conduit 31 creates a pressure differential across the head 65 sufficient to retain the valve element 51 in the position of FIG. 1, and this differential pressure holds the valve element 51 in position as the leaf spring 71 travels from the shoulder 63 to the shoulder 61. As soon as the leaf spring 71 moves just beyond the neutral position, it snaps instantly to the position of FIG. 3, and in so doing, engages the shoulder 61 and moves the valve element 51 against the differential pressure referred to above to the position of FIG. 3. The pump 19 can then immediately withdraw liquid from the container 13 and because the conduit 31 is sealed from the pump 19, the container 15 can be replaced with a full container.

During the initial portion of its downward travel, the plunger 79 is resisted only by the relatively light spring 107. However, when the cams 139 engage the cam tracks 123, movement of the plunger 79 downwardly and thereafter is also resisted by the resilience of the leaf spring 71 and of the springs 77. After the leaf spring 71 has snapped through neutral and the pump 19 is withdrawing liquid from the container 13, the spring 107 can return the plunger 79 to the position shown in FIG. 1. However, the rocker body 109 remains in its counterclockwise position of FIG. 3 so that when the container 13 is empty, the next operation of the plunger 79 will cause the cams 139 to engage the righthand portion of the cam tracks 123 with the result that the rocker body 109 will be pivoted clockwise back to the position of FIG. 1. Accordingly, each actuation of the plunger 79, whether manually by pushing the button 133 or as a result of a pressure drop in the chamber 41 due to one of the containers 13 and 15 being empty, results in a switching of the container which is to supply liquid for the pump 19.

Because of the manner in which the leaf spring 71 is mounted, the spring system is bistable and the leaf spring passes through a neutral or center position in moving between its two states. The resilience of the spring 77 acts on the bracket 75 to provide the leaf spring 71, in effect, with greater resilient biasing force. The coil springs 77 assure that there will be a more predictable resilient force acting on the valve element 51 and cause the bracket 75 to form a resilient anchor for the leaf spring.

The space between the shoulders 61 and 63 of the valve element 51 provides some free travel or lost motion between the leaf spring 71 and the valve element 51. This is useful in assuring that the leaf spring 71 will be fully through and beyond the neutral position by a predetermined distance before encountering the resistance of the valve element 51. Because the leaf spring 71 can exert a greater force when it is displaced farther from the neutral position, this free travel assures that the leaf spring will be able to exert a substantial force on the valve element sufficient to move the valve element against the initial differential fluid pressure tending to retain it in position.

Although an exemplary embodiment of the invention has been shown and described, many changes, modifications and substitutions may be made by one having ordinary skill in the art without necessarily departing from the spirit and scope of this invention.

I claim:

1. A dispensing system with automatic storage means selection, said dispensing system comprising:
   first storage means for storing a liquid to be dispensed;

second storage means for storing a liquid to be dispensed, each of said storage means being essentially closed to the atmosphere at least when such storage means has at least some of the liquid removed therefrom;

a pump having an intake side and a discharge side;

a pressure responsive selector coupled to both of said storage means and the intake side of said pump;

said selector including linearly reciprocable valve means movable between a first position in which the selector provides communication between said first storage means and said pump and blocks communication between said second storage means and said pump and a second position in which the selector provides communication between said second storage means and said pump and blocks communication between said first storage means and said pump; and pressure responsive actuator means responsive to the pressure drop at the selector resulting from at least the partial arrest of the liquid flow from the storage means supplying liquid to the selector for moving the valve means from one of said positions to the other of said positions whereby liquid can be supplied from the other of said storage means through the selector to the pump and the storage means which previously supplied liquid to the selector can be replaced.

2. A dispensing system as defined in claim 1 wherein said valve means includes first and second valve seats communicating, respectively, with the first and second storage means and a valve element movable between said first position in which the valve element engages the first valve seat and is spaced from the second valve seat to allow flow from the second storage means and said second position in which the valve element engages the second valve seat and is spaced from the first valve seat to allow flow from the first storage means.

3. A dispensing system as defined in claim 1 wherein said valve means is arranged so that suction pressure from the pump tends to hold the valve means in whichever of said positions the valve means is placed.

4. A dispensing system as defined in claim 1 wherein each of said storage means is collapsible.

5. A dispensing system with automatic storage means selection, said dispensing system comprising:

first storage means for storing a liquid to be dispensed;

second storage means for storing a liquid to be dispensed, each of said storage means being essentially closed to the atmosphere at least when such storage means has at least some of the liquid removed therefrom;

a pump having an intake side and a discharge side;

a pressure responsive selector coupled to both of said storage means and the intake side of said pump;

said selector including valve means movable between a first position in which the selector provides communication between said first storage means and said pump and blocks communication between said second storage means and said pump and a second position in which the selector provides communication between said second storage means and said pump and blocks communication between said first storage means and said pump;

pressure responsive actuator means responsive to the pressure drop at the selector resulting from at least the partial arrest of the liquid flow from the storage means supplying liquid to the selector for moving the valve means from one of said positions to the other of said positions whereby liquid can be supplied from the other of said storage means through the selector to the pump and the storage means which previously supplied liquid to the selector can be replaced; and said actuator means including a pressure responsive plunger movable in response to said pressure drop and means responsive to such movement of the plunger to move the valve means from said first position to said second position.

6. A dispensing system as defined in claim 5 wherein said means responsive to movement of the plunger includes a pivotally mounted rocker having a cam track thereon, an actuator member drivable by the pressure-responsive plunger and engageable with the cam track to pivot the rocker, and means for drivingly coupling the rocker and the valve means.

7. A dispensing system with automatic storage means selection, said dispensing system comprising:

first storage means for storing a liquid to be dispensed;

second storage means for storing a liquid to be dispensed, each of said storage means being essentially closed to the atmosphere at least when such storage means has at least some of the liquid removed therefrom;

a pump having an intake side and a discharge side;

a pressure responsive selector coupled to both of said storage means and the intake side of said pump;

said selector including valve means movable between a first position in which the selector provides communication between said first storage means and said pump and blocks communication between said second storage means and said pump and a second position in which the selector provides communication between said second storage means and said pump and blocks communication between said first storage means and said pump;

pressure responsive actuator means responsive to the pressure drop at the selector resulting from at least the partial arrest of the liquid flow from the storage means supplying liquid to the selector for moving the valve means from one of said positions to the other of said positions whereby liquid can be supplied from the other of said storage means through the selector to the pump and the storage means which previously supplied liquid to the selector can be replaced; and said actuator means including bistable spring means having first and second states and a neutral position between said states with said bistable spring means in said first and second states at least assisting in retaining the valve means in said first and second positions, respectively.

8. A dispensing system as defined in claim 7 wherein said actuator means includes means to move said bistable spring means from either of said states through said neutral position whereby the bistable spring means can snap to the state toward which it was moved, said bistable spring means providing at least some of the driving force for moving the valve means between said positions as the bistable spring means moves between said states thereof.

9. A dispensing system as defined in claim 8 wherein said bistable spring means includes a leaf spring movable between said first and second states and through said neutral position, a force applying member for engaging the leaf spring, and resilient means for urging the force applying member in a direction to move the leaf spring farther from the neutral position, and said actuator means includes pressure responsive means responsive to said pressure drop for driving the leaf spring through said neutral position whereby the leaf spring can snap to the state toward which it was moved, said leaf spring being drivingly coupled to said valve means whereby the leaf spring and the resilient means provide at least some of the force for moving the valve means between said positions thereof.

10. A dispensing system as defined in claim 9 wherein said pressure responsive means includes a pivotally mounted rocker having a cam track thereon coupled to one end of the leaf spring, a pressure responsive plunger movable in response to said pressure drop and an actuator member drivable by the pressure responsive plunger and engageable with the cam track to pivot the rocker and move the leaf spring through the neutral position, said plunger being pivotable and pivoting in response to cooperation between the actuator member and the cam track.

11. A dispensing system with automatic storage means selection, said dispensing system comprising:
   first storage means for storing a liquid to be dispensed;
   second storage means for storing a liquid to be dispensed, each of said storage means being essentially closed to the atmosphere at least when such storage means has at least some of the liquid removed therefrom;
   a pump having an intake side and a discharge side;
   a pressure responsive selector coupled to both of said storage means and the intake side of said pump;
   said selector including valve means movable between a first position in which the selector provides communication between said first storage means and said pump and blocks communication between said second storage means and said pump and a second position in which the selector provides communication between said second storage means and said pump and blocks communication between said first storage means and said pump;
   pressure responsive actuator means responsive to the pressure drop at the selector resulting from at least the partial arrest of the liquid flow from the storage means supplying liquid to the selector for moving the valve means from one of said positions to the other of said positions whereby liquid can be supplied from the other of said storage means through the selector to the pump and the storage means which previously supplied liquid to the selector can be replaced; and
   said actuator means including bistable spring means having first and second states and a neutral position between said states for at least assisting in moving the valve means between said positions thereof and means for drivingly coupling the bistable spring means to the valve means with lost motion to enable the bistable spring means to move from one of its states through the neutral position before initiating driving of the valve means from one of said positions toward the other of said positions.

12. An automatic selector for a liquid dispensing system comprising:
   a housing having first and second inlets, an outlet and passage means for communicating each of the inlets with the outlet;
   valve means on said housing movable between a first position in which the passage means provides communication between the first inlet and the outlet and the valve means blocks communication between the second inlet and the outlet and a second position in which the passage means provides communication between the second inlet and the outlet, and the valve means blocks communication between the first inlet and the outlet;
   pressure responsive actuator means within said housing responsive to a presure drop of a particular magnitude at the inlet which is in communication with the outlet for moving said valve means from one of the positions to the other of said positions; and
   said actuator means including a pressure responsive plunger movable in response to said pressure drop and means including a bistable spring for drivingly coupling the plunger and the valve means so that the plunger can move the valve means from said first position to said second position.

13. A selector as defined in claim 12 wherein said valve means includes first and second valve seats communicating, respectively, with the first and second inlets and a valve element movable between said first position in which the valve element engages the second valve seat and is spaced from the first valve seat to allow flow from the first inlet to the outlet and said second position in which the valve element engages the first valve seat and is spaced from the second valve seat to allow flow from the second inlet to the outlet.

14. An automatic selector for a liquid dispensing system comprising:
   a housing having first and second inlets, an outlet and passage means for communicating each of the inlets with the outlet;
   valve means on said housing movable between a first position in which the passage means provides communication between the first inlet and the outlet and the valve means blocks communication between the second inlet and the outlet and a second position in which the passage means provides communication between the second inlet and the outlet, and the valve means blocks communication between the first inlet and the outlet;
   pressure responsive actuator means within said housing responsive to a pressure drop of a particular magnitude at the inlet which is in communication with the outlet for moving said valve means from one of the positions to the other of said positions; and
   said actuator means including bistable spring means having first and second states and a neutral position between said states with said bistable spring means in said first and second states at least assisting in retaining the valve means in said first and second positions, respectively.

15. A selector as defined in claim 14 wherein said actuator means includes means to move said bistable spring means from either of said states through said neutral position whereby the bistable spring means can snap to the state toward which it was moved, said bistable spring means providing at least some of the driving force for moving the valve means between said positions as the bistable spring means moves between said states thereof.

16. A selector as defined in claim 15 wherein said bistable spring means includes a leaf spring movable between said first and second states and through said neutral position, a force applying member for engaging the leaf spring, and resilient means for urging the force applying member in a direction to move the leaf spring farther from the neutral position, and said actuator means includes pressure responsive means responsive to said pressure drop for driving the leaf spring through said neutral position whereby the leaf spring can snap to the state toward which it was moved, said leaf spring being drivingly coupled to said valve means whereby the leaf spring and the resilient means provide at least some of the force for moving the valve means between said positions thereof.

17. A selector as defined in claim 16 wherein said pressure responsive means includes a pivotally mounted rocker having a cam track thereon coupled to one end of the leaf spring, a pressure responsive plunger movable in response to said pressure drop and an actuator member drivable by the pressure responsive plunger and engageable with the cam track to pivot the rocker and move the leaf spring through the neutral position, said plunger being pivotable and pivoting in response to cooperation between the actuator member and the cam track.

18. An automatic selector for a liquid dispensing system comprising:
a housing having first and second inlets, an outlet and passage means for communicating each of the inlets with the outlet;
valve means on said housing movable between a first position in which the passage means provides communication between the first inlet and the outlet and the valve means blocks communication between the second inlet and the outlet and a second position in which the passage means provides communication between the second inlet and the outlet, and the valve means blocks communication between the first inlet and the outlet;
pressure responsive actuator means within said housing responsive to a pressure drop of a particular magnitude at the inlet which is in communication with the outlet for moving said valve means from one of the positions to the other of said positions; and
said actuator means including bistable spring means having first and second states and a neutral position between said states for at least assisting in moving the valve means between said positions thereof and means for drivingly coupling the bistable spring means to the valve means with lost motion to enable the bistable spring means to move from one of its states through the neutral position before initiating driving of the valve means from one of said positions toward the other of said positions.

19. An automatic selector for a liquid dispensing system comprising:
a housing having first and second inlets, an outlet and passage means for communicating each of the inlets with the outlet;
valve means on said housing movable between a first position in which the passage means provides communication between the first inlet and the outlet and the valve means blocks communication between the second inlet and the outlet and a second position in which the passage means provides communication between the second inlet and the outlet, and the valve means blocks communication between the first inlet and the outlet;
pressure responsive actuator means within said housing responsive to a pressure drop of a particular magnitude at the inlet which is in communication with the outlet for moving said valve means from one of the positions to the other of said positions; and
said actuator means including a leaf spring for at least assisting in driving the valve means between said positions thereof, a rocker body having a slot for receiving an end portion of the leaf spring, said leaf spring being urged toward the rocker body, a rocker shaft extending into the rocker body and communicating with said slot whereby the end of the leaf spring at said one end portion thereof bears on said shaft, the peripheral portion of the shaft at said slot being more resistant than the rocker body to being cut by said end of the leaf spring, means including the shaft for mounting the rocker body for pivotal movement and pressure responsive means for pivoting the rocker body to move the leaf spring to bring about movement of the valve means from one of said positions to the other.

20. An automatic selector for a liquid dispensing system comprising:
a housing having first and second inlets, an outlet and passage means for communicating each of the inlets with the outlet;
valve means on said housing movable betwaeen a first position in which the passage means provides communication between the first inlet and the outlet and the valve means blocks communication between the second inlet and the outlet and a second position in which the passage means provides communication between the second inlet and the outlet, and the valve means blocks communication between the first inlet and the outlet;
pressure responsive actuator means within said housing responsive to a pressure drop of a particular magnitude at the inlet which is in communication with the outlet for moving said valve means from one of the positions to the other of said positions;
said actuator means including a pressure responsive plunger movable in response to said pressure drop and means responsive to such movement of the plunger to move the valve means from said first position to said second position; and
said means responsive to movement of the plunger including a pivotally mounted rocker having a cam track thereon, an actuator member drivable by the pressure-responsive plunger and engageable with the cam track to pivot the rocker, and means for drivingly coupling the rocker and the valve means.

* * * * *